United States Patent
Weingärtner

(10) Patent No.: US 12,454,033 B2
(45) Date of Patent: Oct. 28, 2025

(54) MACHINING DEVICE FOR MACHINING A WORKPIECE

(71) Applicant: AFW Holding GmbH, Kirchham (AT)

(72) Inventor: Dominik Weingärtner, Pettenbach (AT)

(73) Assignee: AFW Holding GmbH, Kirchham (AT)

( * ) Notice: Subject to any disclaimer, the term of this patent is extended or adjusted under 35 U.S.C. 154(b) by 333 days.

(21) Appl. No.: 17/272,384

(22) PCT Filed: Aug. 30, 2019

(86) PCT No.: PCT/EP2019/073244
§ 371 (c)(1),
(2) Date: Mar. 1, 2021

(87) PCT Pub. No.: WO2020/048892
PCT Pub. Date: Mar. 12, 2020

(65) Prior Publication Data
US 2021/0323106 A1    Oct. 21, 2021

(30) Foreign Application Priority Data
Sep. 3, 2018    (EP) ..................... 18192225

(51) Int. Cl.
*B23Q 3/157*    (2006.01)
*B23Q 39/02*    (2006.01)

(52) U.S. Cl.
CPC ....... *B23Q 3/15706* (2013.01); *B23Q 39/024* (2013.01); *Y10T 29/5114* (2015.01);
(Continued)

(58) Field of Classification Search
CPC ............. Y10T 29/5109; Y10T 29/5114; Y10T 483/115; Y10T 483/1748; Y10T 483/179;
(Continued)

(56) References Cited

U.S. PATENT DOCUMENTS 3,486,209 A * 12/1969 Shultz ..................... B23B 3/164
29/27 R
3,750,245 A * 8/1973 Kennedy ................. B23B 3/161
29/27 R
(Continued)

FOREIGN PATENT DOCUMENTS

CN    104128650 A    11/2014
DE    9305653 U1    8/1994
(Continued)

OTHER PUBLICATIONS

Notice of Reasons for Refusal dated Jan. 4, 2023 pertaining to JP application No. 20210511587 filed Aug. 30, 2019, pp. 1-7.
(Continued)

*Primary Examiner* — Sunil K Singh
*Assistant Examiner* — Michael J Vitale
(74) *Attorney, Agent, or Firm* — Dinsmore & Shohl LLP

(57) ABSTRACT

A machining apparatus (1) for machining a workpiece (3), comprising a first machining tool (4) for machining a workpiece (3) to be machined by means of the machining apparatus (1) and at least one second machining tool (5) for machining the or a second workpiece (3) to be machined by means of the machining apparatus (1), as well as a mounting apparatus (6) for mounting the first machining tool (4) and the at least one second machining tool (5), wherein the mounting apparatus (6) comprises a main body (7), wherein the first machining tool (4) is arranged or formed on a first main-body portion (7a) and the at least one second machining tool (5) is arranged or formed on a second main-body portion (7b) that is different from the first main-body portion (7a).

10 Claims, 2 Drawing Sheets

(52) U.S. Cl.
CPC .......... *Y10T 409/307672* (2015.01); *Y10T 409/308232* (2015.01); *Y10T 483/115* (2015.01); *Y10T 483/1793* (2015.01)

(58) Field of Classification Search
CPC ......... Y10T 483/1793; Y10T 483/1795; Y10T 483/1752; Y10T 483/1755; Y10T 408/93; Y10T 408/935; Y10T 409/307672; Y10T 409/308232; Y10T 409/308512; B23Q 39/024; B23Q 3/15706; B23Q 3/15713; B23Q 1/52; B23C 1/08; B23C 1/12
USPC .......... 483/3, 36, 38, 39, 54, 55, 56, 33; 29/27 C, 27 R; 409/201, 211, 216; 408/236, 237
See application file for complete search history.

(56) References Cited

U.S. PATENT DOCUMENTS

| | | | | |
|---|---|---|---|---|
| 3,786,539 | A * | 1/1974 | Foll | B23Q 39/02 29/27 R |
| 3,930,301 | A * | 1/1976 | Wagner | B23Q 3/157 483/54 |
| 4,571,796 | A * | 2/1986 | Sellner | B23Q 3/15766 29/27 R |
| 4,785,525 | A * | 11/1988 | Ishida | B23B 3/161 29/27 R |
| 5,313,694 | A * | 5/1994 | Yonemoto | G05B 19/182 29/27 R |
| 5,478,271 | A * | 12/1995 | Thibaut | B24B 45/003 483/33 |
| 6,357,094 | B1 * | 3/2002 | Sugimoto | B23Q 1/623 409/212 |
| 7,134,173 | B2 * | 11/2006 | Gstir | B23Q 1/623 409/203 |
| 7,384,224 | B2 * | 6/2008 | Ferrari | B23Q 1/012 409/212 |
| 7,566,193 | B2 * | 7/2009 | Haj-Fraj | B23C 1/12 409/185 |
| 8,950,987 | B2 * | 2/2015 | Okada | B23B 35/00 409/211 |
| 2002/0014139 | A1 * | 2/2002 | Hirose | B23B 3/168 82/121 |
| 2003/0041706 | A1 * | 3/2003 | Sugiura | B23Q 39/024 82/1.11 |
| 2005/0188516 | A1 * | 9/2005 | Schneider | B23B 3/065 29/27 C |
| 2015/0140899 | A1 * | 5/2015 | Guo | B24B 25/00 451/72 |
| 2019/0232441 | A1 * | 8/2019 | Yu | B23B 3/162 |

FOREIGN PATENT DOCUMENTS

| | | | |
|---|---|---|---|
| DE | 102005050829 A1 | 4/2007 | |
| EP | 0949029 A1 | 10/1999 | |
| JP | H1034461 A | 2/1998 | |
| JP | 2000202728 A | 7/2000 | |
| JP | 2005103656 A | 4/2005 | |
| JP | 2009-006455 A * | 1/2009 | ............ B23Q 11/08 |
| KR | 20120009127 A | 2/2012 | |
| WO | 2008013313 A1 | 12/2009 | |

OTHER PUBLICATIONS

Notice of Reasons for Refusal dated Jun. 7, 2022 pertaining to JP application No. 20210511587 filed Aug. 30, 2019, pp. 1-11.
International Search Report and Written Opinion pertaining to PCT/EP2019/073244, dated Dec. 12, 2019.
JP Decision of Dismissal of Amendment dated Jun. 20, 2023 pertaining to JP application No. 20210511587 filed Aug. 30, 2019, pp. 1-8.

* cited by examiner

MACHINING DEVICE FOR MACHINING A WORKPIECE

CROSS REFERENCE TO RELATED APPLICATIONS

The present specification is a National Phase Entry of International Application No. PCT/EP2019/073244 filed Aug. 30, 2019 and entitled "Machining Device For Machining A Workpiece" which, itself, claims priority to EP 18 192 225.3 filed Sep. 3, 2018 and entitled "Machining Device For Machining A Workpiece," each of which are incorporated by reference herein in their entireties.

FIELD

The present specification relates to a machining apparatus for machining a workpiece, comprising a first machining tool for machining a workpiece to be machined by means of the machining apparatus and at least one second machining tool for machining the or a second workpiece to be machined by means of the machining apparatus.

BACKGROUND

Machining apparatuses for machining a workpiece are known in principle from the field of workpiece machining in a large number of embodiments.

Here, machining apparatuses are also known which comprise a plurality of machining tools for machining a workpiece to be machined. Corresponding machining apparatuses are typically used for forming complex workpiece geometries, such as those that may be provided in certain rotor components, for example.

The functional and also structural design of corresponding machining apparatuses comprising a plurality of machining tools is sometimes complex, meaning that there is a need for improvement or development with regard to a simple but reliable design of a machining apparatus comprising a plurality of machining tools.

SUMMARY

The object of the embodiments described herein is to provide a simple but reliably designed machining apparatus comprising a plurality of machining tools.

The object is achieved by a machining apparatus for machining a workpiece according to claim 1. The claims that are dependent thereon relate to advantageous embodiments of the machining apparatus according to claim 1.

The machining apparatus described herein is used in general for machining a workpiece. A corresponding workpiece may be an elongate workpiece, i.e. a cylinder, for example. The workpiece to be machined is typically made of a machinable metal.

As set out in the following, the machining apparatus is or can be typically used in a superordinate machining center for the mechanical processing, i.e. in particular machining, of workpieces, or forms a component of such a machining center.

The machining apparatus comprises a plurality of machining tools for machining a workpiece to be machined by means of the machining apparatus. Specifically, the machining apparatus comprises a first machining tool for machining a workpiece to be machined by means of the machining apparatus and at least one second or additional machining tool (referred to in the following as a "second machining tool") for machining the or a workpiece to be machined by means of the machining apparatus.

The first machining tool may in general be a turning tool, a drilling tool or a milling tool. The second machining tool may in general also be a drilling tool or a milling tool. Specifically, the first machining tool may be a drilling tool or an end milling tool and the second machining tool may be a side milling tool, in particular a profiled side milling tool. The exemplary combination of a drilling tool or milling tool as the first machining tool and an in particular profiled side milling tool as the second machining tool constitutes one embodiment. In general, the specific selection of the machining tools is to be made with regard to the machining of a workpiece that is to be carried out by means of the machining apparatus and/or with regard to the workpiece geometry to be produced thereby.

The machining apparatus comprises a mounting apparatus. The mounting apparatus is configured to mount the first machining tool and the second machining tool.

The mounting apparatus comprises a main body, on which the first and the second machining tool are or can be mounted. The main body typically comprises a housing structure, which is typically closed at least in portions, and in particular completely, and is referred to as the main-body housing for short, and on or in which certain functional units, i.e. the machining tools, for example, of the machining apparatus are arranged or formed. The main-body housing may comprise an interior space in which certain functional units of the machining apparatus are arranged or formed. The main-body housing may be surrounded at least in portions, optionally completely, by at least one screen element or wall element, which (co-) determines the outer spatial form of the main-body housing.

For mounting the first and second machining tool on the main body, the main body or the main-body housing typically comprises at least one first mounting interface for mounting the or a first machining tool on the main body or main-body housing and at least one second mounting interface for mounting the or a second machining tool on the main body or main-body housing. A corresponding, main-body-side mounting interface may e.g. comprise one or more, in particular mechanical, mounting elements, which interact directly or indirectly with one or more, potentially corresponding, in particular mechanical, mounting elements on the part of a machining tool that is mounted or is to be mounted on the main body or main-body housing. The mounting typically consists in attaching or fastening a particular machining tool to the main body or main-body housing in a detachable manner (without being damaged or destroyed) where required.

It is essential that the first machining tool is arranged or formed or mounted on a first main-body portion or first main-body-housing portion and the second machining tool is arranged or formed or mounted on a second main-body portion or second main-body-housing portion that is different from the first main-body portion. As set out in the following, a main-body portion or main-body-housing portion is in particular understood to be a main-body face or first main-body-housing face. The main body therefore makes it possible to mount at least two machining tools on different main-body portions or main-body faces and thus at different mounting positions, in particular relative to a workpiece to be machined by means of the machining apparatus. The machining tools mounted on the main body or main-body housing can therefore be mountable or mounted in different mounting positions and thus in different spatial directions or spatial planes, in particular relative to one another. As set out in the following, mounting the first machining tool on the first main-body portion in particular allows a workpiece that is to be machined by means of the machining apparatus to be machined laterally, i.e. allows the lateral face of a cylindrical workpiece to be machined, for example, and mounting the second machining tool on the second main-body portion in particular (also) allows a workpiece that is to be machined by means of the machining apparatus to be machined on the end face, i.e. (also) allows the end face of a cylindrical workpiece to be machined, for example.

Overall, owing to the mounting apparatus and/or the main body associated therewith, a comparatively simply designed but reliable and highly integrated machining unit is provided.

Different supply lines, i.e. in particular supply lines that are or can be assigned to the machining tools, i.e. electrical supply lines, coolant and/or lubricant supply lines, for example, may be arranged or formed on and/or in the main body or main-body housing. The main body or main-body housing may, as mentioned, comprise at least one interior space at least in portions, in which corresponding supply lines are arranged or formed at least in portions. Of course, other functional units of the machining apparatus may also be arranged or formed in the or a corresponding interior space.

The first main-body portion may be formed in the region of a first exposed outer-face portion of the main body and the second main-body portion may be formed in the region of a second exposed outer-face portion of the main body that is different from the first exposed outer-face portion of the main body. The machining tools may therefore be arranged or formed and thus mounted on different outer-face portions of the main body. As a result, a different spatial arrangement with regard to a workpiece to be machined by means of the machining apparatus is typically also provided and, as a consequence thereof, highly integrated, i.e. in particular simultaneous, machining of the workpiece is possible on or in different workpiece portions. The first exposed outer-face portion of the main body may in particular be arranged in a first, in particular vertically oriented, spatial plane or may be oriented in a spatial plane parallel to such a spatial plane and the second exposed outer-face portion of the main body may in particular be arranged in a second, in particular vertically oriented, spatial plane that is different from the first spatial plane or may be oriented in a spatial plane parallel to such a spatial plane. Mounting the first machining tool on the first exposed outer-face portion typically allows a workpiece that is to be machined by means of the machining apparatus to be machined laterally, as mentioned above, and mounting the second machining tool on the second exposed outer-face portion allows a workpiece that is to be machined by means of the machining apparatus to be machined on the end face, as mentioned above.

The main body may have a basic shape defined by a polygonal base and a polygonal top face, in particular a prism-like or cuboid-like basic shape. In principle, both regular and irregular prism-like or cuboid-like basic shapes come into consideration. Furthermore, both geometrically defined and geometrically undefined prism-like or cuboid-like basic shapes come into consideration. According to an embodiment, the main body has a prism-like or prism-shaped basic shape. According to a particular embodiment, the main body has a cuboid-like or cuboid-shaped basic shape; this also covers a cube-like or cube-shaped basic shape. The main body may in general have a tower-like or tower-shaped geometric shape; the main body can therefore be described or considered as a mounting tower or tower.

Proceeding from an exemplary prism-like or cuboid-like basic shape of the main body, the first machining tool may be arranged or formed or mounted on a first (planar) face of the main body, in particular a first side face of the main body, and the at least one second machining tool may be arranged or formed or mounted on a second (planar) face of the main body that is different from the first face, in particular a second side face of the main body that is different from the first side face. The two side faces are typically not the base or the end faces of the main body.

The first face or first side face of the main body may be arranged and/or oriented so as to be offset from the second face or second side face of the main body by an angle of less than 180°, in particular by an angle of 135°, 128.5°, 120°, 108°, 90° or 60°, or vice versa. The actual angular offset is determined by the specific basic shape of the main body. The angles 135°, 128.5°, 120°, 108°, 90° or 60°, stated by way of example, also relate, in the corresponding order, to a main body having an octagonal, heptagonal, hexagonal, pentagonal, square or triangular basic shape.

Irrespective of the specific geometry of the main body, the first machining tool may be arranged or formed or mounted on the main body in at least one translational and/or rotational degree of freedom, in particular in one pivoting degree of freedom, relative to the main body. Alternatively or additionally, the second machining tool may be arranged or formed or mounted on the main body in at least one translational and/or rotational degree of freedom, in particular in one pivoting degree of freedom, relative to the main body. Pivoting movements may in particular take place about horizontally or vertically oriented pivot axes. In particular, it is conceivable to pivotably mount the first machining tool about a horizontally oriented axis (y axis) and to pivotably mount the second machining tool about a vertically oriented axis (x axis). Of course, combined movements of a particular machining tool in different degrees of freedom are possible. In this case, the two machining tools may be movable or moved in at least one degree of freedom so as to be dependent on one another or independent of one another; therefore, the first machining tool may e.g. be movable in a first translational and/or a first rotational degree of freedom and the second machining tool, so as to be dependent thereon or independent thereof, may e.g. be movable in a second translational and/or a second rotational degree of freedom, or vice versa. In all cases, suitable guide elements, i.e. guide openings, slots, etc., for example, may be provided in order to facilitate a corresponding guided movement of a movably mounted machining tool in a corresponding degree of freedom. In all cases, at least one, in particular motor-driven, drive apparatus is typically assigned to a relevant machining tool, which apparatus is configured to generate a force that sets the relevant machining tool in motion in a relevant degree of freedom.

A relevant machining tool may in principle be arranged or formed on the main body directly or indirectly, i.e. by inserting at least one assembly.

Indirectly arranging or forming a machining tool on the main body is typically implemented by a machining head assigned to the relevant machining tool. Therefore, the first machining tool may be arranged or formed on a first machining head that is mounted on the main body and/or the second machining tool may be arranged or formed on a second machining head that is mounted on the main body. A machining head typically comprises a coupling interface for coupling a machining tool and an, in particular motor-driven, drive apparatus for generating a drive force that can be transmitted to the respectively coupled machining tool or is transmitted during operation of the machining tool and sets the machining tool into a movement, i.e. in particular a rotational movement. The coupling interface is typically arranged or formed on or in a housing structure of the machining head. The drive apparatus is typically arranged or formed on or in a housing structure of the machining head. The drive apparatus is typically arranged or formed within the housing structure.

A machining head therefore typically comprises a housing structure, which is typically closed at least in portions, and in particular completely, and is referred to as the machining-head housing for short, and on or in which certain functional units of the machining head are arranged or formed. The machining-head housing typically comprises a machining-head-housing interior space, in which certain functional units of the machining head are arranged or formed. The machining-head housing may be surrounded at least in portions, optionally completely, by at least one screen element or wall element, which (co-) determines the outer spatial form of the machining-head housing.

Alternatively or additionally, indirect mounting of a machining tool or a machining head assigned to a relevant machining tool on the main body may for example be implemented by a support apparatus assigned to the relevant machining tool. Therefore, the first machining tool may be arranged or formed on a first support apparatus that is mounted on the main body and/or the second machining tool may be arranged or formed on a second support apparatus that is mounted on the main body. A support apparatus typically comprises a coupling interface for coupling a machining tool or machining head. The coupling interface is typically arranged or formed on or in a housing structure of the support apparatus. The support apparatus may e.g. be formed as a support arm or may comprise at least one such arm.

Typically, the first machining tool or a first machining head assigned to the first machining tool is mounted on the main body by a corresponding support apparatus.

It has been mentioned that the first machining tool and/or the second machining tool may be arranged or formed on the main body in at least one translational and/or rotational degree of freedom relative to the main body. Accordingly, a support apparatus may also be arranged or formed on the main body in at least one translational and/or rotational degree of freedom relative to the main body.

The machining apparatus may be movably mounted (as a whole). As will become clear in the following in connection with the machining center, which likewise forms an aspect of the embodiments described herein in addition to the machining apparatus, the machining apparatus may in particular be moved into at least one workpiece-machining position and into at least one machining-tool change position. The machining apparatus typically moves (at least) in or in parallel with the machine axis (z axis) of a machining center equipped with the machining apparatus. In order to implement a movement of the machining apparatus, it may comprise at least one, in particular motorized, drive apparatus assigned to the main body, which apparatus is configured to generate a drive force that sets the machining apparatus or main body into a movement, in particular from a first workpiece-machining position into at least one second workpiece-machining position that is different from the first workpiece-machining position, and/or into a machining-tool change position. The drive apparatus may e.g. be integrated in the main body.

As indicated, another aspect of the embodiments described herein relates to a machining center for machining a workpiece. The embodiments described herein therefore also relate to a machining center for machining a workpiece. The machining center comprises at least one machining apparatus as described herein. Therefore, all the embodiments relating to the machining apparatus apply by analogy to the machining center.

The machining center may e.g. be designed as a combined drilling-milling center or as a combined milling-milling center or as a combined turning-milling center. By means of the machining center, at least two identical or different machining processes for a workpiece to be machined can therefore be carried out, in particular simultaneously. In addition to the machining apparatus described herein, which is typically configured for drilling and/or turning and/or milling, the machining center may comprise at least one additional machining apparatus, e.g. in the form of a turning apparatus, such that combined drilling and/or milling and/or turning processes can be carried out. In respect of the machining process to be specifically carried out in each case, the machining center typically comprises suitable workpiece-supporting apparatuses or workpiece-clamping apparatuses, e.g. in the form of rests, tailstocks, chucks, etc.

The machining center may comprise at least one store-like or magazine-like receiving apparatus that is arranged or formed in particular in the region of one end of the or a machining axis of the machining center and comprises at least one store-like or magazine-like receiving space for receiving one or more machining tools that can be or are to be mounted on the machining-apparatus-side mounting apparatus. Therefore, different machining tools can be mounted or made available in the machining center, which allows for a simple and rapid machining-tool change. In particular, a partially or fully automated machining-tool change is possible.

A corresponding receiving-apparatus-side receiving space may comprise one or more receiving compartments for each receiving at least one machining tool. Each receiving compartment may be arranged, in a shelf-like manner, in rows and/or columns or in a drum-like manner. Each receiving compartment may be provided with a suitable sensor apparatus, i.e. weight sensors, optical sensors, etc., for example, in order to e.g. identify whether a machining tool is located in a receiving compartment or which machining tool is located in which receiving compartment. Corresponding information may be contained in the sensor information generated by corresponding sensor apparatuses in the form of data. By means of the sensor information generated by corresponding sensor apparatuses, a user can therefore be provided with a comprehensive picture of the current and potentially also future occupancy of the receiving space with machining tools. Of course, corresponding sensor information can in principle be transmitted to any communication partner, i.e. a central manufacturing or control facility, for example, by means of suitable data-transmission apparatuses or connections. The same applies to receiving one or more machining heads in the receiving-apparatus-side receiving space.

Each receiving-apparatus-side receiving space may have a defined receiving axis, in or along which corresponding machining tools can be arranged in the receiving space. A corresponding receiving axis may align with a mounting axis of a machining tool mounted on the main body, and this can facilitate a simple and rapid change of machining tools. The same applies again to receiving one or more machining heads in the receiving-apparatus-side receiving space.

As mentioned, the machining-apparatus-side main body may be movably mounted, i.e. may in particular be moved into at least one workpiece-machining position and into at least one machining-tool change position. The machining-apparatus-side main body can therefore in particular be moved into a machining-tool change position in which the main body is moved relative to the receiving apparatus or a receiving-apparatus-side receiving space such that at least one machining tool mounted on the main body, i.e. the second machining tool, for example, and/or a machining head mounted on the main body, in particular together with a machining tool coupled thereto, can be transferred into a receiving-apparatus-side receiving space. Alternatively, the main body can be moved into a machining-tool change position in which the main body is moved relative to the receiving apparatus or a receiving-apparatus-side receiving space such that at least one machining tool received in the or a receiving-apparatus-side receiving space, i.e. a second machining tool, for example, and/or a machining head received in the or a receiving-apparatus-side receiving space, in particular together with a machining tool coupled thereto, can be transferred out of a receiving-apparatus-side receiving space to the main body.

The main body that has been moved into the machining-tool change position can be arranged on or in the receiving apparatus or a receiving-apparatus-side receiving space such that at least one machining tool mounted on the main body, i.e. the second machining tool, for example, and/or a machining head mounted on the main body, in particular together with a machining tool coupled thereto, can be transferred into a receiving-apparatus-side receiving space and/or such that at least one machining tool received in the or a receiving-apparatus-side receiving space, i.e. a second machining tool, for example, and/or a machining head received in the or a receiving-apparatus-side receiving space, in particular together with a machining tool coupled thereto, can be transferred out of a receiving-apparatus-side receiving space to the main body. In the machining-tool change position, the main body may be arranged at least in portions, in particular completely, in the machining-center-side machining space, and this is the case in particular if the main body is arranged in the machining-change position on the receiving apparatus or a receiving-apparatus-side receiving space. Alternatively, in the machining-tool change position, the main body may be arranged at least in portions, in particular completely, in the receiving-apparatus-side receiving space, and this is the case in particular if the main body is arranged in the machining-tool change position in the receiving apparatus or a receiving-apparatus-side receiving space.

The main body can therefore be moved out of the machining space into the receiving space (and vice versa) for changing at least one machining tool and/or machining head. In this case, the main body is typically moved far enough into the receiving space that a machining tool to be changed is moved into a position relative to a mounting position, located within the receiving space, of a machining tool and/or machining head to be changed, which position allows for the machining tool and/or machining head to be changed accordingly.

The machining center may comprise at least one handling apparatus for handling respective machining tools or machining heads. A corresponding handling apparatus is expediently configured to implement handling of respective machining tools or machining heads that is or can be automated, in particular in connection with transferring machining tools or machining heads into or out of a corresponding receiving space. A corresponding handling apparatus may e.g. be formed as a gripper apparatus comprising at least one gripper element or may comprise at least one such gripper apparatus. A gripper apparatus may e.g. be formed as a (multi-axis) robot arm.

The receiving apparatus or a receiving-apparatus-side receiving space may be separated from a machining space of the machining center, in which the actual workpiece machining is carried out, by a separating apparatus comprising at least one separating element that is movably mounted in a translational and/or rotational degree of freedom. The thus provided option of separating the receiving apparatus or a receiving-apparatus-side receiving space from the machining space where required is advantageous since this allows tasks to be carried out within the receiving space independently of a machining process; therefore, it is possible to perform tasks within the receiving space, e.g. in connection with an upcoming or completed machining-tool change, while a machining process is being carried out, since separating the receiving space from the machining space e.g. ensures that no chips can get into the receiving space, for example. Specifically, the receiving space can therefore be equipped with certain machining tools while a machining process is being carried out, which would be impossible or almost impossible without an appropriate separation option for reasons of safety, in particular for manually equipping the receiving space.

The movably mounted separating element may in particular be mounted so as to be movable between an open position, in which it is possible to access the receiving apparatus or a receiving-apparatus-side receiving space from a machining space of the machining center and to access the machining space of the machining center from the receiving apparatus or a receiving-apparatus-side receiving space, and a closed position, in which it is not possible to access the receiving apparatus or a receiving-apparatus-side receiving space from a machining space of the machining center or to access the machining space of the machining center from the receiving apparatus or a receiving-apparatus-side receiving space. For example, the movably mounted separating element may be a window, a gate, or a door, for example.

Movements of the main body, in particular between respective machining positions and machining-tool change positions, of the handling apparatus or the handling elements associated with the handling apparatus as well as of the separating apparatus or the separating elements associated with the separating apparatus are typically performed by a hardware-implemented and/or software-implemented, machining-center-side control apparatus. The control apparatus is therefore configured to generate control information controlling movements of the main body, in particular between respective machining positions and machining-tool change positions, of the handling apparatus or the handling elements associated with the handling apparatus as well as of the separating apparatus or the separating elements associated with the separating apparatus.

Using the machining apparatus described herein and/or the machining center described herein, a method for machining a workpiece to be machined can be implemented, which likewise constitutes part of the embodiments described herein. In order to carry out the method, at least one corresponding machining apparatus or machining center is used.

BRIEF DESCRIPTION OF THE DRAWINGS

The machining apparatus described herein is explained in the drawings on the basis of an embodiment. In the drawings.

DETAILED DESCRIPTION

Figure 1:
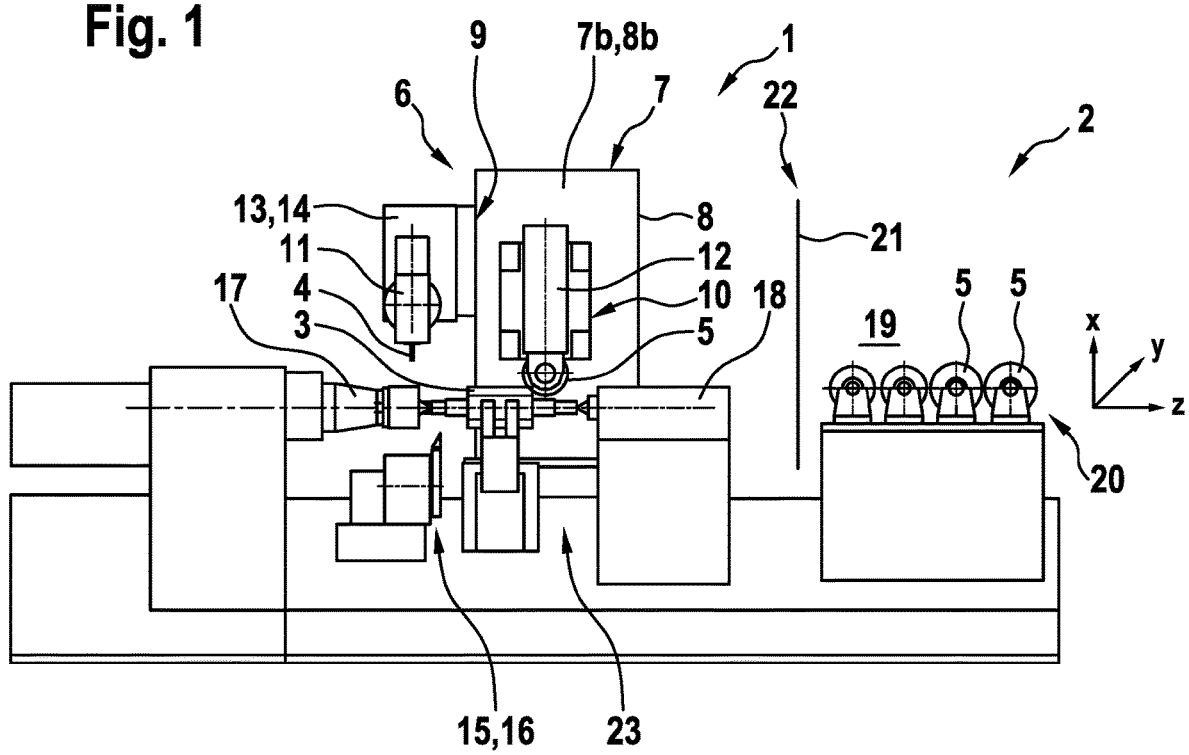
FIG. 1 is a schematic diagram of one view of a machining apparatus and a machining center according to an embodiment.

FIGS. 1-4 each show a schematic diagram of a machining apparatus 1 and a machining center 2 according to an embodiment. The machining apparatus 1 and the machining center are in a side view in FIGS. 1 and 3, and in a plan view in FIGS. 2 and 4. The machining apparatus 1 clearly constitutes a component of the machining center 2, which is superordinate thereto.

The machining apparatus 1 and thus also the machining center 2 are used for machining a workpiece 3. The workpiece 3 made of a machinable metal has, by way of example, an elongate cylindrical geometry in the embodiment shown in the drawings.

The machining apparatus 1 comprises a first machining tool 4 for machining the workpiece 3 to be machined by means of the machining apparatus 1 and a second machining tool 5 for machining the workpiece 3 to be machined by means of the machining apparatus 1.

In the embodiment shown in the drawings, the first machining tool 4 is a drilling tool or an end milling tool and the second machining tool 5 is a side milling tool, in particular a profiled side milling tool. In general, the specific selection of the machining tools 4, 5 is made with regard to the machining of a workpiece 3 that is to be carried out by means of the machining apparatus 1 and/or with regard to the workpiece geometry to be produced thereby.

The machining apparatus 1 comprises a mounting apparatus 6 for mounting the first machining tool 4 and the second machining tool 5.

The mounting apparatus 6 comprises a main body 7, on which the first and the second machining tool 4, 5 are mounted. The main body 7 comprises a housing structure, referred to as the main-body housing 8, on or in which certain functional units, i.e. the machining tools 4, 5, for example, of the machining apparatus 1 are arranged or formed. The main-body housing 8 may comprise an interior space in which certain functional units of the machining apparatus 1 are arranged or formed. The main-body housing 8 may be surrounded at least in portions, optionally completely, by at least one screen element or wall element, which (co-) determines the outer spatial form of the main-body housing 8.

For mounting the first and second machining tool 4, 5 on the main body 7, the main body 7 or the main-body housing 8 comprises a first mounting interface 9 for mounting the first machining tool 4 on the main body 7 or main-body housing 8 and a second mounting interface 10 for mounting the second machining tool 5 on the main body 7 or main-body housing 8. A corresponding, main-body-side mounting interface 9, 10 may e.g. comprise one or more, in particular mechanical, mounting elements (not provided with explicit reference signs), which interact directly or indirectly with one or more, potentially corresponding, in particular mechanical, mounting elements (not provided with explicit reference signs) on the part of a machining tool 4, 5 that is mounted or is to be mounted on the main body 7 or main-body housing 8. The mounting typically consists in attaching or fastening a particular machining tool 4, 5 to the main body 7 or main-body housing 8 in a detachable manner (without being damaged or destroyed) where required.

In the embodiment shown in the drawings, the machining tools 4, 5 are each mounted on the main body 7 or main-body housing 8 by a machining head 11, 12 assigned to each of said tools. It is also applicable to the first machining tool 4 that the first machining head 11 assigned thereto is mounted on the main body 7 or main-body housing 8 on a support apparatus 14 formed by a support arm 13. The machining tools 4, 5 are therefore arranged or formed on the main body 7 or main-body housing 8 indirectly, i.e. by inserting at least one assembly.

It is essential that the first machining tool 4 is mounted on a first main-body portion 7a or first main-body-housing portion 8a and the second machining tool 5 is mounted on a second main-body portion 7b or second main-body-housing portion 8b that is different from the first main-body portion 7a or first main-body-housing portion 8a. The main body 7 therefore makes it possible to mount at least two machining tools 4, 5 on different main-body portions 7a, 7b and thus at different mounting positions, in particular relative to the workpiece 3 to be machined by means of the machining apparatus 1.

The machining tools 4, 5 mounted on the main body 7 or main-body housing 8 are therefore mountable or mounted in different mounting positions and thus in different spatial directions or spatial planes, in particular relative to one another. Mounting the first machining tool 4 on the first main-body portion 7a allows the workpiece 3 that is to be machined by means of the machining apparatus 1 to be machined laterally, i.e. allows the lateral face of the workpiece 3 to be machined, and mounting the second machining tool 5 on the second main-body portion 7b (also) allows the workpiece 3 that is to be machined by means of the machining apparatus 1 to be machined on the end face, i.e. (also) allows the end face of the workpiece 3 to be machined.

It is clear that the first main-body portion 7a is formed in the region of a first exposed outer-face portion of the main body 7 and the second main-body portion 7b is formed in the region of a second exposed outer-face portion of the main body 7 that is different from the first exposed outer-face portion of the main body 7. The machining tools 4, 5 are therefore mounted on different outer-face portions of the main body 7. As a result, a different spatial arrangement with regard to the workpiece 3 to be machined by means of the machining apparatus 1 is also provided and, as a consequence thereof, highly integrated, i.e. in particular simultaneous, machining of the workpiece 3 is possible on or in different workpiece portions. The first exposed outer-face portion of the main body 7 is arranged in a first, in particular vertically oriented, spatial plane or is oriented in a spatial plane parallel to such a spatial plane and the second exposed outer-face portion of the main body 7 is arranged in a second, in particular vertically oriented, spatial plane that is different from the first spatial plane or is oriented in a spatial plane parallel to such a spatial plane. Mounting the first machining tool 4 on the first exposed outer-face portion allows the workpiece 3 that is to be machined by means of the machining apparatus 1 to be machined laterally, as mentioned above, and mounting the second machining tool 5 on the second exposed outer-face portion allows the workpiece 3 that is to be machined by means of the machining apparatus 1 to be machined on the end face, as mentioned above.

In the embodiment shown in the drawings, the main body 7 has a prism-like or cuboid-like basic shape defined by a polygonal base and a polygonal top face. The main body 7 therefore has a tower-like or tower-shaped geometric shape, which is why the main body 7 can therefore be described or considered as a mounting tower or tower.

Starting from the prism-like or cuboid-like basic shape of the main body 7, the first machining tool 4 is mounted on a first (planar) face of the main body 7, i.e. a first side face of the main body 7, and the second machining tool 5 is mounted on a second (planar) face of the main body 7 that is different from the first face, i.e. a second side face of the main body 7 that is different from the first side face. In the embodiment shown in the drawings, the first face or first side face of the main body 7 is arranged and/or oriented so as to be offset from the second face or second side face of the main body 7 by an angle of 90°.

The machining tools 4, 5 can each be mounted on the main body 7 in at least one translational and/or rotational degree of freedom, in particular in one pivoting degree of freedom, relative to the main body 7. Pivoting movements may in particular take place about horizontally or vertically oriented pivot axes; cf. the x, y and z axes shown in the drawings. In particular, it is conceivable to pivotably mount the first machining tool 4 about a horizontally oriented y axis and to pivotably mount the second machining tool 5 about a vertically oriented x axis. The first machining tool 4 and the second machining tool 5 may also be movably mounted translationally along the vertically oriented x axis, independently of one another, such that the first and the second machining tool 4, 5 can be moved into different vertical positions relative to the workpiece 3 to be machined. The first machining tool 4 and the second machining tool 5 are also movably mounted translationally along the horizontally oriented z axis.

The first machining tool 4 can be translationally mounted along the y axis by accordingly movably mounting the support arm 13 or support apparatus 14 relative to the main body 7. The first machining tool 4 can be translationally mounted along the x axis by accordingly movably mounting the support arm 13 or support apparatus 14 relative to the main body 7 and/or by accordingly movably mounting the first machining head 11 relative to the support arm 13 or support apparatus 14.

The second machining tool 5 can be translationally mounted along the y axis by accordingly movably mounting the second machining head 11 relative to the main body 7. The first machining tool 4 can likewise be translationally mounted along the x axis by accordingly movably mounting the second machining head 11 relative to the main body 7.

Of course, combined movements of a particular machining tool 4, 5 in different degrees of freedom are possible. In this case, the two machining tools 4, 5 may be movable or moved in at least one degree of freedom so as to be dependent on one another or independent of one another; therefore, the first machining tool 4 may e.g. be movable in a translational degree of freedom and the second machining tool 5, so as to be dependent thereon or independent thereof, may e.g. be movable in a rotational degree of freedom, or vice versa. In all cases, suitable guide elements (not explicitly shown), i.e. guide openings, slots, etc., for example, may be provided in order to facilitate a corresponding guided movement of a movably mounted machining tool 4, 5 in a corresponding degree of freedom. In all cases, at least one, in particular motor-driven, drive apparatus (not explicitly shown) is typically assigned to a relevant machining tool 4, 5, which apparatus is configured to generate a force that sets the relevant machining tool 4, 5 in motion in a relevant degree of freedom.

Figure 2:
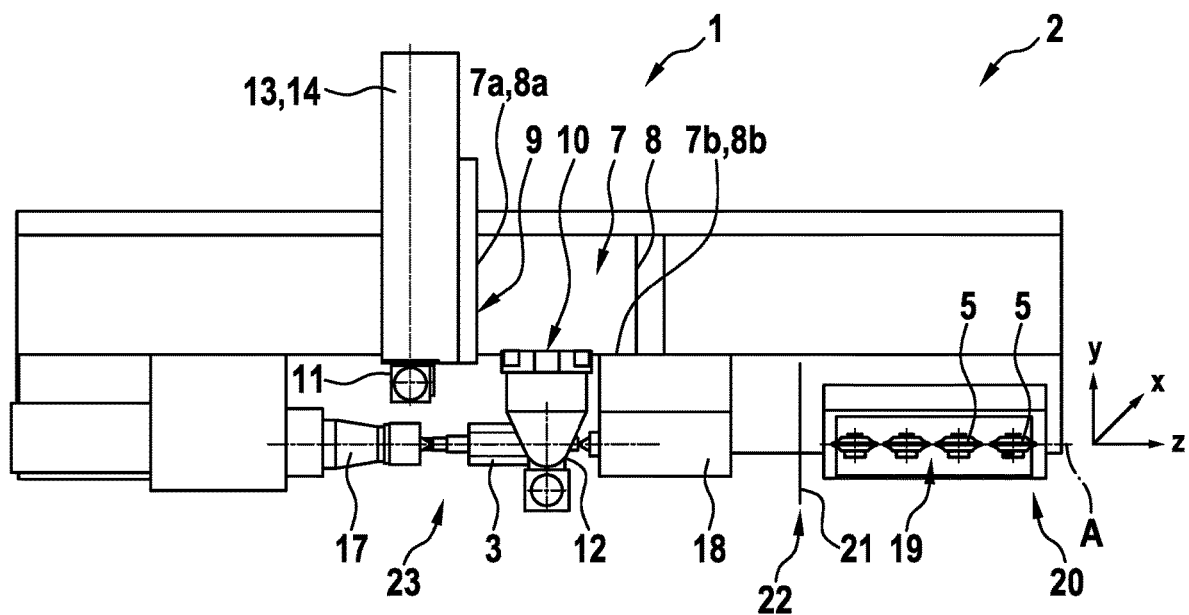
FIG. 2 is a schematic diagram of one view of a machining apparatus and a machining center according to an embodiment.

In addition to the above-described movable mounting (option) of the machining tools 4, 5, the machining apparatus 1 may also be movably mounted (as a whole). In this case, the machining apparatus 1 may in particular be moved into at least one workpiece-machining position (such a position is shown in FIGS. 1 and 2) and into at least one machining-tool change position. The machining apparatus 1 moves in or in parallel with the machine axis (z axis) of the machining center 2. In order to implement a movement of the machining apparatus 1, it may comprise at least one, in particular motorized, drive apparatus (not explicitly shown) assigned to the main body 7, which apparatus is configured to generate a drive force that sets the machining apparatus 1 or main body 7 into a movement, in particular from a first workpiece-machining position into at least one second workpiece-machining position that is different from the first workpiece-machining position, and/or into a machining-tool change position. The drive apparatus may e.g. be integrated in the main body 7.

In connection with the machining apparatus 1, it should also be noted that the machining heads 11, 12 typically comprise a coupling interface (not provided with an explicit reference sign) for coupling a relevant machining tool 4, 5 and an, in particular motor-driven, drive apparatus (not provided with an explicit reference sign) for generating a drive force that can be transmitted to the respectively coupled machining tool 4, 5 or is transmitted during operation of the machining tool 4, 5 and sets the machining tool 4, 5 into a movement, i.e. in particular a rotational movement. The coupling interface is typically arranged or formed on or in a housing structure of the relevant machining head 11, 12. The drive apparatus is typically arranged or formed on or in a housing structure of the relevant machining head 11, 12. The drive apparatus is typically arranged or formed within the housing structure.

A relevant machining head 11, 12 therefore typically comprises a housing structure, which is typically closed at least in portions, and in particular completely, and is referred to as the machining-head housing for short, and on or in which certain functional units of the machining head 11, 12 are arranged or formed. The machining-head housing typically comprises a machining-head-housing interior space, in which certain functional units of the machining head 11, 12 are arranged or formed. The machining-head housing may be surrounded at least in portions, optionally completely, by at least one screen element or wall element, which (co-) determines the outer spatial form of the machining-head housing.

In connection with the machining apparatus 1, it should lastly be noted that the support apparatus 14 typically comprises a coupling interface (not provided with an explicit reference sign) for coupling a machining tool 4, 5 or a machining head 11, 12. The coupling interface is typically arranged or formed on or in a housing structure of the support apparatus 14. In the embodiment shown in the drawings, the machining center 2 is designed, by way of example, as a combined drilling-milling center or as a combined milling-milling center or as a combined turning-milling center. By means of the machining center 2, at least two identical or different machining processes for a workpiece 3 to be machined can therefore be carried out, in particular simultaneously. In addition to the machining apparatus 1, which is typically configured for drilling and/or turning and/or milling, the machining center 2, as shown in the embodiment shown in the drawings, may comprise at least one additional machining apparatus 15, e.g. in the form of a turning apparatus 16, such that combined drilling and/or milling and/or turning processes can be carried out. In respect of the machining process to be specifically carried out in each case, the machining center 2 typically comprises suitable workpiece-supporting apparatuses 17, 18 or workpiece-clamping apparatuses, e.g. in the form of rests, tailstocks, chucks, etc.

The machining center 2 comprises a store-like or magazine-like receiving apparatus 20 that is arranged or formed in the region of one end of the or a machining axis of the machining center 2 and comprises a store-like or magazine-like receiving space 19 for receiving one or more machining tools 5 that can be or are to be mounted on the machining-apparatus-side mounting apparatus 6. Therefore, different machining tools 5 can be mounted or made available in the machining center 2, which allows for a simple and rapid machining-tool change. In particular, a partially or fully automated machining-tool change is possible.

The receiving space 19 may comprise one or more receiving compartments for each receiving at least one machining tool 5. Each receiving compartment may be arranged, in a shelf-like manner, in rows and/or columns or in a drum-like manner. Each receiving compartment may be provided with a suitable sensor apparatus, i.e. weight sensors, optical sensors, etc., for example, in order to e.g. identify whether a machining tool 5 is located in a receiving compartment or which machining tool 5 is located in which receiving compartment. Corresponding information may be contained in the sensor information generated by corresponding sensor apparatuses in the form of data. By means of the sensor information generated by corresponding sensor apparatuses, a user can therefore be provided with a comprehensive picture of the current and potentially also future occupancy of the receiving space 19 with machining tools 5. Of course, corresponding sensor information can in principle be transmitted to any communication partner, i.e. a central manufacturing or control facility, for example, by means of suitable data-transmission apparatuses or connections. The same applies to receiving one or more machining heads 12 in the receiving-apparatus-side receiving space 19.

The receiving space 19 may have a defined receiving axis (cf. axis A in FIG. 2), in or along which corresponding machining tools 5 can be arranged in the receiving space 19. The receiving axis may align with a mounting axis of the machining tool 5 mounted on the main body 7, and this can facilitate a simple and rapid change of machining tools 5. The same may apply to receiving one or more machining heads 12 in the receiving space 19.

Figure 3:
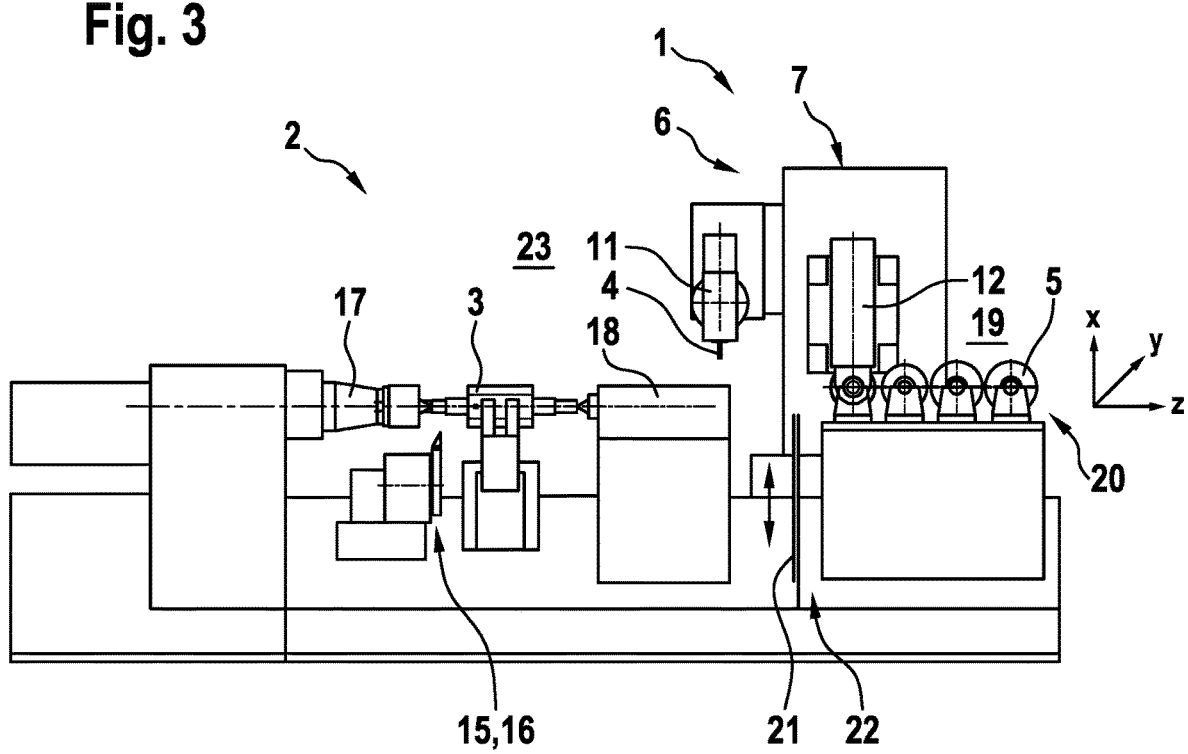
FIG. 3 is a schematic diagram of one view of a machining apparatus and a machining center according to an embodiment.
Figure 4:
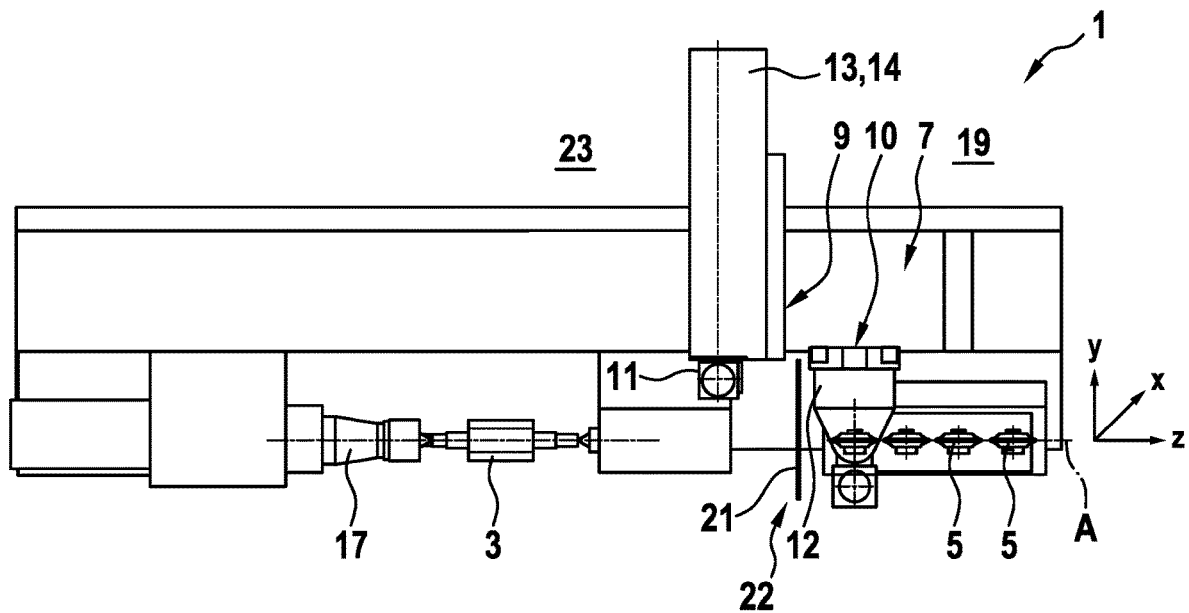
FIG. 4 is a schematic diagram of one view of a machining apparatus and a machining center according to an embodiment.

As mentioned, the machining-apparatus-side main body 7 may be movably mounted, i.e. may in particular be moved into at least one workpiece-machining position and into at least one machining-tool change position. The machining-apparatus-side main body can therefore in particular be moved into a machining-tool change position, as shown in FIGS. 3 and 4, in which the main body 7 is moved relative to the receiving apparatus 20 or the receiving space 19 such that at least one machining tool 5 mounted on the main body 7, i.e. the second machining tool 5, for example, and/or a machining head 12 mounted on the main body, in particular together with a machining tool 5 coupled thereto, can be transferred into the receiving space 19. Alternatively or additionally, the main body 7 can be moved into a machining-tool change position in which the main body 7 is moved relative to the receiving apparatus 20 or the receiving space 19 such that at least one machining tool 5 received in the receiving space 19, i.e. a second machining tool 5, for example, and/or a machining head 12 received in the receiving space 19, in particular together with a machining tool 5 coupled thereto, can be transferred out of the receiving space 19 to the main body 7.

On the basis of FIGS. 3 and 4, it is clear that the main body 7 that has been moved into the machining-tool change position can be arranged on or in the receiving apparatus 20 or the receiving space 19 such that a machining tool 4, 5 mounted on the main body 7, i.e. the second machining tool 5, for example, and/or a machining head 12 mounted on the main body 7, in particular together with a machining tool 5 coupled thereto, can be transferred into the receiving space 19 and/or such that a machining tool 4, 5 received in the receiving space 19, i.e. a second machining tool 5, for example, and/or a machining head received in the receiving space 19, in particular together with a machining tool 4, 5 coupled thereto, can be transferred out of the receiving space 19 to the main body 7.

In the embodiment shown in the drawings, the main body 7 is arranged in the receiving space 19 at least in portions, and in particular completely, in the machining-tool change position. The main body 7 is movable or moved out of the machining space 23 of the machining center 2, in which the actual workpiece machining is carried out, into the receiving space 19 (and vice versa) for changing a machining tool 4, 5 and/or machining head 11, 12. It is clear that the main body 7 is moved far enough into the receiving space 19 that a machining tool 4, 5 to be changed is moved into a position relative to a mounting position, located within the receiving space 19, of a machining tool 4, 5 and/or machining head to be changed, which position allows for the machining tool 4, 5 and/or machining head to be changed accordingly.

The machining center 2 may comprise at least one handling apparatus (not shown) for handling respective machining tools 4, 5 or machining heads 11, 12. The handling apparatus is expediently configured to implement handling of respective machining tools 4, 5 or machining heads 11, 12 that is or can be automated, in particular in connection with transferring machining tools 4, 5 or machining heads 11, 12 into or out of a corresponding receiving space 19. The handling apparatus may e.g. be formed as a gripper apparatus comprising at least one gripper element or may comprise at least one such gripper apparatus. A gripper apparatus may e.g. be formed as a (multi-axis) robot arm.

In the embodiment shown in the drawings, the receiving apparatus 20 or the receiving space 19 can be separated from the machining space 23 by a separating apparatus 22 comprising a separating element 21 that is movably mounted in a translational and/or rotational degree of freedom. The thus provided option of separating the receiving apparatus 20 or the receiving space 19 from the machining space 23 where required is advantageous since this allows tasks to be carried out within the receiving space 19 independently of a machining process; therefore, it is possible to perform tasks within the receiving space 20, e.g. in connection with an upcoming or completed machining-tool change, while a machining process is being carried out, since separating the receiving space 20 from the machining space 23 e.g. ensures that no chips can get into the receiving space 20, for example. Specifically, the receiving space 20 can therefore be equipped with certain machining tools 4, 5 while a machining process is being carried out, which would be impossible or almost impossible without an appropriate separation option for reasons of safety, in particular for manually equipping the receiving space 20.

The movably mounted separating element 21 is mounted so as to be movable in particular between an open position, in which it is possible to access the receiving apparatus 20 or the receiving space 19 from a machining space 23 and to access the machining space 23 from the receiving apparatus 20 or the receiving space 19, and a closed position, in which it is not possible to access the receiving apparatus 20 or the receiving space 20 from a machining space 23 or to access the machining space 23 from the receiving apparatus 20 or the receiving space 19. An exemplary vertical movement of the separating element 21 is indicated in FIG. 3 by the double-headed arrow. For example, the movably mounted separating element 21 may be a window, a gate, or a door, for example.

Movements of the main body 7, in particular between respective machining positions and machining-tool change positions, of the handling apparatus or the handling elements associated with the handling apparatus as well as of the separating apparatus 22 or the separating elements 21 associated with the separating apparatus are typically performed so as to be controlled by a hardware-implemented and/or software-implemented, machining-center-side control apparatus (not shown). The control apparatus is therefore configured to generate control information controlling movements of the main body 7, in particular between respective machining positions and machining-tool change positions, of the handling apparatus or the handling elements associated with the handling apparatus as well as of the separating apparatus 22 or the separating elements 21 associated with the separating apparatus.

Using the machining apparatus 1 shown in the drawings and/or the machining center 2 shown in FIG. 1, a method for machining a workpiece 3 to be machined can be implemented.

The invention claimed is:

1. A machining apparatus for machining an elongate cylindrical workpiece, the machining apparatus comprising:
a first machining tool for machining the workpiece to be machined by means of the machining apparatus,
at least one second machining tool for machining the workpiece or a second workpiece to be machined by means of the machining apparatus, and
a mounting apparatus for mounting the first machining tool and for mounting the at least one second machining tool,
wherein the mounting apparatus comprises a main body,
wherein the first machining tool is supported on the main body via a first machining head, wherein the first machining head is mounted on a first face of the main body in one pivoting degree of freedom about a horizontally oriented pivot axis relative to the main body so as to be pivotable in different machining positions relative to the workpiece when the first machining tool is engaged with the workpiece, wherein in one of the different machining positions a longitudinal center axis of the first machining tool extends in a vertical direction, wherein the first machining head is mounted to the first face of the main body via a support apparatus that is translationally moveable along the first face of the main body in the vertical direction, the first machining head comprising a first mounting interface for coupling the first machining tool thereto;
wherein the at least one second machining tool is supported on the main body via a second machining head, the second machining head being mounted on a second face of the main body, and wherein the at least one second machining tool is arranged in one pivoting degree of freedom about a vertically oriented pivot axis relative to the main body so as to be pivotable in different machining positions relative to the workpiece when the at least one second machining tool is engaged with the workpiece,
wherein the at least one second machining head is arranged on the second face of the main body such that the at least one second machining head is translationally moveable along the second face of the main body in the vertical direction independent of the first machining head,
wherein the first face of the main body is different than the second face of the main body, the first face of the main body extending parallel to a first vertically-extending spatial plane and the second face of the main body extending parallel to a second vertically-extending spatial plane, and the first vertically-extending spatial plane and the second vertically-extending spatial plane are offset from one another by an angle of less than 180° and greater than 0°, and
wherein the at least one second machining tool is a disc milling cutter, the disc milling cutter defining a vertically-extending disc plane when supported by the second machining head.

2. The machining apparatus according to claim 1, wherein the main body has a shape defined by a polygonal base and a polygonal top face.

3. The machining apparatus according to claim 1, wherein at least one drive apparatus is assigned to the main body, the at least one drive apparatus being configured to generate a drive force that sets the main body into movement from a first machining position into at least one second machining position that is different from the first machining position, and/or into a machining-tool change position.

4. The machining apparatus according to claim 1, wherein the first machining tool is or comprises a turning tool, a drilling tool, or a milling tool.

5. The machining apparatus of claim 1, further comprising a separator movable between an open position and a closed position, wherein:
the separator is positioned between a machining space of the machining apparatus and a receiving space;
the main body is movable between the machining space of the machining apparatus and the receiving space when the separator is in the open position to move the main body towards and away from a magazine receiving apparatus positioned in the receiving space;
the main body is not movable between the machining space of the machining apparatus and the receiving space when the separator is in the closed position, and
wherein the receiving apparatus comprises at least one tool receiver for receiving the at least one second machining tool.

6. A machining center for machining a workpiece, the machining center comprising at least one machining apparatus according to claim 1.

7. The machining center according to claim 6,
wherein at least one magazine receiving apparatus is arranged in a region of one end of a machining axis of the machining center, and
wherein the receiving apparatus comprises at least one tool receiver for receiving the at least one second machining tool.

8. The machining center according to claim 7, wherein the main body can be moved into a machining-tool change position in which the main body is moved relative to the receiving apparatus such that at least one second machining tool mounted on the main body and the second machining head mounted on the main body can be moved into a receiving-apparatus-side receiving space of at least one receiving space and/or in which the main body is moved relative to the receiving apparatus such that at least one second machining tool and the second machining head can be moved out of the receiving-apparatus-side receiving space.

9. The machining center according to claim 7, wherein the receiving apparatus can be separated from a machining space of the machining center by a separating apparatus comprising at least one separator that is mounted so as to be movable between an open position, in which it is possible to access the receiving apparatus from the machining space of the machining center and to access the machining space of the machining center from the receiving apparatus, and a closed position, in which it is not possible to access the receiving apparatus from the machining space of the machining center or to access the machining space of the machining center from the receiving apparatus.

10. A method for machining a workpiece, wherein the machining apparatus according to claim 1 is provided and is used for carrying out the method.

\* \* \* \* \*